United States Patent
Dhairyawan et al.

(10) Patent No.: US 7,650,324 B2
(45) Date of Patent: Jan. 19, 2010

(54) METHODS AND SYSTEMS FOR PROVIDING CONTEXT-BASED REFERENCE INFORMATION

(75) Inventors: Nikhil Dhairyawan, Eppelheim (DE); Ilya Khandamirov, Sandhausen (DE); Vladislav Bezrukov, Sandhausen (DE); Matthias Kammerer, Karlsruhe (DE); Andreas Hirche, Leutershausen (DE); Christian Lieske, Wiesloch (DE); Denis Kolyzaev, St. Petersburg (RU)

(73) Assignee: SAP AG., Walldorf (DE)

( * ) Notice: Subject to any disclaimer, the term of this patent is extended or adjusted under 35 U.S.C. 154(b) by 337 days.

(21) Appl. No.: 11/210,962

(22) Filed: Aug. 25, 2005

(65) Prior Publication Data

US 2007/0050403 A1    Mar. 1, 2007

(51) Int. Cl.
*G06F 7/00* (2006.01)
(52) U.S. Cl. .............................. 707/1; 707/2; 715/230; 715/266
(58) Field of Classification Search ........................ None
See application file for complete search history.

(56) References Cited

U.S. PATENT DOCUMENTS

| | | | |
|---|---|---|---|
| 5,822,539 A * | 10/1998 | van Hoff | 707/E17.119 |
| 5,878,429 A | 3/1999 | Morris et al. | |
| 5,950,215 A | 9/1999 | Tabuchi | |
| 5,956,708 A | 9/1999 | Dyko et al. | |
| 6,003,046 A | 12/1999 | Nielsen | |
| 6,021,405 A * | 2/2000 | Celis et al. | 707/2 |
| 6,167,409 A | 12/2000 | DeRose et al. | |
| 6,240,412 B1 | 5/2001 | Dyko et al. | |
| 6,253,366 B1 | 6/2001 | Mutschler, III | |
| 6,289,460 B1 | 9/2001 | Hajmiragha | |
| 6,351,272 B1 | 2/2002 | Kanungo | |
| 6,484,182 B1 | 11/2002 | Dunphy et al. | |
| 6,519,617 B1 | 2/2003 | Wanderski et al. | |
| 7,003,506 B1 * | 2/2006 | Fisk et al. | 707/1 |
| 7,502,832 B2 * | 3/2009 | San Andres et al. | 707/1 |
| 2004/0260702 A1 * | 12/2004 | Cragun et al. | 707/100 |

\* cited by examiner

*Primary Examiner*—Tim T. Vo
*Assistant Examiner*—Jau-Shya Meng
(74) *Attorney, Agent, or Firm*—Finnegan, Henderson, Farabow, Garrett & Dunner LLP

(57) ABSTRACT

Methods and systems are disclosed for providing within edited shell documents contextual information associated with a referenced object. The methods and systems may receive a request from an author to insert a reference to a fragment object into a shell document reflecting content to be displayed and generate response data including a reference to the fragment object and a first property reflecting contextual information associated with the fragment object. The shell document may be modified by inserting the response data into the shell document. The methods and system may also render the modified shell document including the response data such that the response data conveys a user-ascertainable characteristic of the fragment object based on the first property.

17 Claims, 8 Drawing Sheets

METHODS AND SYSTEMS FOR PROVIDING CONTEXT-BASED REFERENCE INFORMATION

TECHNICAL FIELD

The present invention generally relates to content management systems and, more particularly, to systems and methods for providing contextual-based reference information for content-based documents.

BACKGROUND

The advent and growth of the World Wide Web and networking software enable private individuals and business personnel to access information from an increasing number of sources, such as web servers, database servers, enterprise systems, and other forms of information storage systems. The information provides data for certain business processes. Accordingly, businesses rely on systems and techniques that ensure the correct data is generated and displayed as content on a user's computer display device.

To ensure the consistency of displayed information, businesses continue to harness various technologies associated with distributed systems to develop and provide specialized services. One type of technology that is gaining popularity are web services designed for business processes. A business web service is system functionality that is accessible over the Internet, an Intranet, and even an Extranet, using standard web-based protocols (e.g., Hyper Text Transfer Protocol (HTTP)). Such services may provide content that is configured and published using description languages, such as Hyper Text Transfer Markup Language (HTML) and eXtensible Markup Language (XML) interfaces and messages. Accordingly, business process services are an ideal way for businesses to provide services in heterogeneous environments where a consumer of these services may be a user operating a desktop, an application program, or even another business process hosted on any number of different platforms.

Although service technologies allow businesses to publish and retrieve information through a network, the information has to be natively managed or temporarily transformed into XML. Further, documents may be created through references to smaller chunks of data. For example, during the creation of XML-based documents, a user may use entity references or Xinclude statements to reference other content when creating a content conglomerate (i.e., a document that is constructed of smaller referenced content). One problem for the user who is editing or authoring a content conglomerate is that the references to other content do not reveal or identify the content associated with the references in a format ascertainable to a user. Accordingly, there is a need for a solution to the assembly-based approach to content management lifecycles (i.e., a decontextualized approach to editing and authoring content-based documents).

SUMMARY

The present invention is directed to methods and systems for providing context-based reference information for documents. In one aspect of the present invention, a method is disclosed for providing reference information for an object. The method may receive a request from an author to insert a reference to a fragment object into a shell document reflecting content to be rendered and generate response data including a reference to the fragment object and a first property reflecting contextual information associated with the fragment object. The shell document may be modified by inserting the response data into the shell document. The method may also include rendering the modified shell document including the response data such that the response data conveys a user-ascertainable characteristic of the fragment object based on the first property.

In another aspect of the invention, a system is disclosed for providing reference information for a shell document. The system may include a first and second computing system. The first computing system may execute a first process for generating a shell document, rendering the shell document for editing by an author, and receiving a first request from the author to insert a reference to a fragment object in the shell document. The second computing system may maintain the fragment object along with a first property reflecting a contextual characteristic of the fragment object, generate the reference to the fragment object based on the first request, and provide to the first computing system the reference and the first property. In one aspect, the first computing system updates the rendered shell document including the reference and first property such that the first property conveys the contextual characteristic in a user-ascertainable format.

In another aspect, a system is disclosed including a computing system having a processor for executing program code stored in a storage device and a rendering module for rendering data based on the executed program code. In certain aspects, the program code performs a process, when executed by the processor, for creating a shell document by rendering a representation of the shell document. In response to a request to insert a reference to a fragment object, the process may modify the rendered representation of the shell document to include the reference to the fragment object along with contextual information describing a user-ascertainable characteristic associated with the fragment object.

The foregoing background and summary are not intended to be comprehensive, but instead serve to help artisans of ordinary skill understand the following implementations consistent with the invention set forth in the appended claims. In addition, the foregoing background and summary are not intended to provide any independent limitations on the claimed invention.

BRIEF DESCRIPTION OF THE DRAWINGS

The accompanying drawings, which are incorporated in and constitute a part of this specification, show certain aspects of the present invention and, together with the description, help explain some of the principles associated with the invention.

DETAILED DESCRIPTION

The following description refers to the accompanying drawings, in which, in the absence of a contrary representation, the same numbers in different drawings represent similar elements. The implementations set forth in the following description do not represent all implementations consistent with the claimed invention. Instead, they are merely some examples of systems and methods consistent with certain aspects related to the invention.

Overview

Methods and systems consistent with certain aspects of the present invention provide context information associated with referenced information inserted in a shell document. Context information, as the term is used herein, refers to information that describes one or more characteristics of a fragment object. In certain aspects, the context information may be configured such that when viewed, a user may ascertain the information without having to decode or otherwise perform additional interpreting processes to read the information. For example, an author who is editing or creating a shell document (e.g., a conglomerate document formed of fragment objects that may reflect additional content) may insert a reference to a fragment object using a software application editing tool. The terms "conglomerate document" and "shell document" may be used interchangeably in describing the aspects of the present invention. In response to the request to insert a reference, an authoring computing system may request and receive a reference to the requested fragment object from a data warehouse system. In certain aspects, the authoring computing system may also receive one or more properties associated with the requested fragment object. These properties may represent context information associated with certain characteristics of the requested fragment object, such as a title of the object, the size of the object, a textual summary describing the object, etc. The authoring computing system inserts the reference to the fragment object in the shell document based on the author's request. Additionally, the one or more parameters are inserted with the reference to provide user-ascertainable context information associated with the fragment object to the author and authoring computing system. Therefore, instead of simply receiving cryptic technical reference data corresponding to the fragment object, the authoring computing system may receive and render information that describes, in user-ascertainable format, one or more characteristics of the fragment object. Thus, the author is able to view and comprehend the contextual information associated with the referenced object.

The foregoing discussion is intended to introduce and provide initial clarity for some of the aspects associated with the present invention. Further details of the above-mentioned functionality and additional aspects, features, and embodiments of the present invention are described below.

Exemplary System Environment

Figure 1:
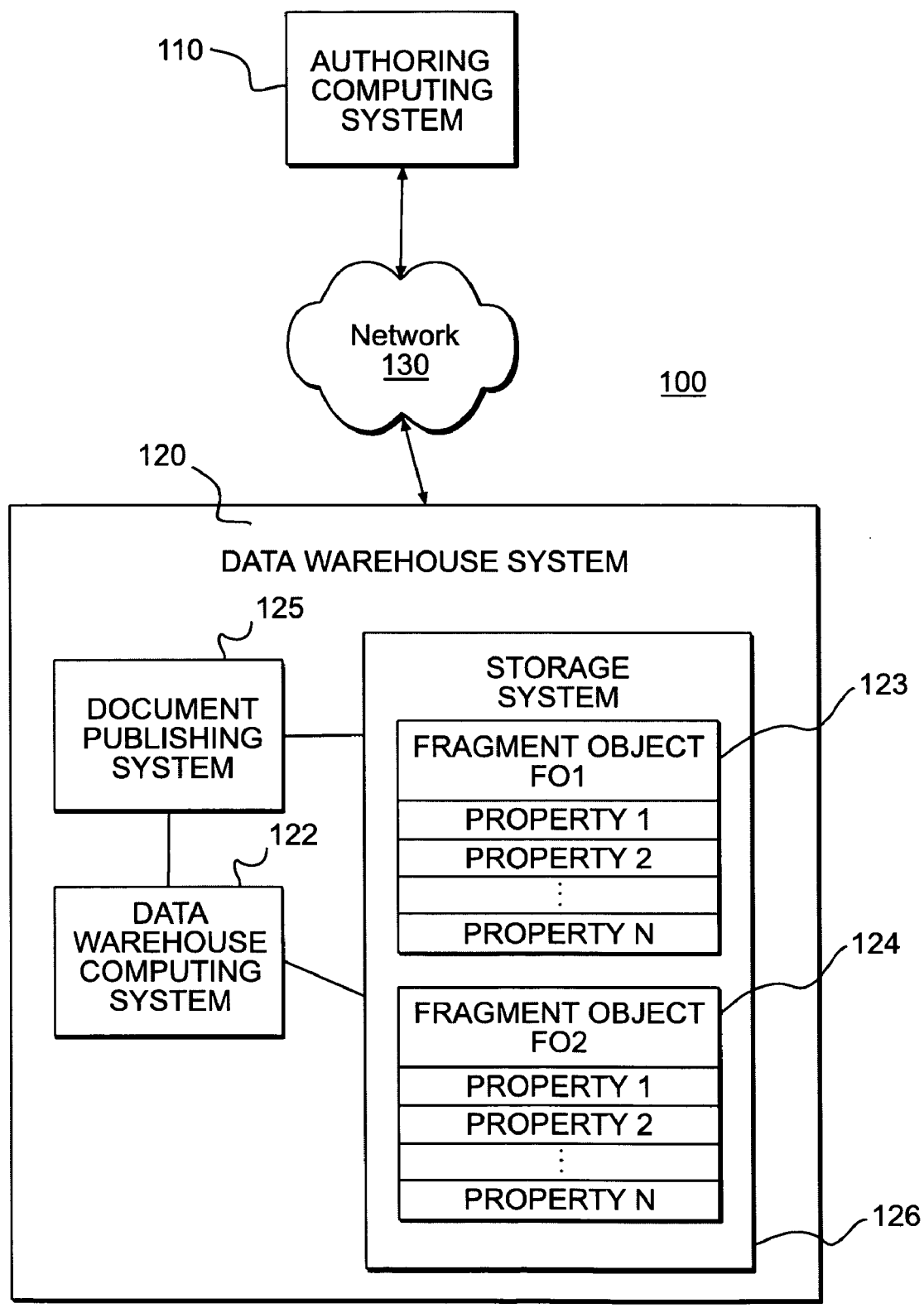
FIG. 1 illustrates a block diagram of an exemplary system environment consistent with certain aspects related to the present invention.

FIG. 1 illustrates a block diagram of an exemplary system environment 100 consistent with certain aspects related to the present invention. As shown, system environment 100 includes an authoring computing system 110, a data warehouse system 120, and network 130.

Authoring computing system 110 may be implemented using one or more computers that perform computer executed processes. In one aspect, authoring computing system 110 may execute one or more processes that enable a user (i.e., an author) to create and edit shell documents. A shell document may be a conglomerate of objects or documents that may include data, such as content to be rendered in a user interface. For example, a shell document may be an XML description document of a user manual for a software application that is published by a business process. This exemplary shell document may include one or more references to fragment objects that correspond to the content that make up the user manual when displayed in a user interface. Authoring computing system 110 may include components consistent with computing systems, such as processors, memory, and input/output devices that enable an author to create and edit shell documents via editing software that is executed by system 110. Further, authoring computing system 110 may execute one or more software processes that enable system 110 to exchange data with data warehouse system 120 via network 130.

Data warehouse system 120 may be implemented using a computer configured to perform one or more processes consistent with certain aspects related to the present invention. For instance, data warehouse system 120 may include a data warehouse computing system 122, document publishing system 125, and storage system 126. Data warehouse computing system 122 may be a processing system that executes software processes for creating shell documents in a source format (e.g., XML). In certain aspects, data warehouse computing system may perform software process (or leverage external systems and/or processes) for publishing the documents in a target format, such as HTML. Data warehouse computing system 122 may include computer components, such as processors, memory, and interface devices that allow system 122 to generate, edit, and retrieve documents and/or objects. In one aspect, data warehouse computing system 122 executes one or more software processes that interact with authoring computing system 110 to create and edit shell documents in accordance with certain aspects related to the present invention.

Document publishing system 125 may be implemented using a computer configured to execute software processes for creating and rendering shell documents that have been generated in a source format, such as XML. For example, publishing system 125 may perform processes that apply XML stylesheets for rendering documents in a target format. Other types of rendering and publishing software and data may be implemented by document publishing system 125 for rendering the content included in a shell document on a computer display device.

Storage system 126 may be one or more storage devices that manage and store data used by data warehouse system 120 to create, edit, and publish documents. In one aspect, storage system 126 stores one or more fragment objects (e.g., 123, 124) that are associated with content that may be used in one or more shell documents for one or more business processes. Although FIG. 1 shows two fragment objects 123 and 124, any number of fragment objects may be implemented by data warehouse system 120 and stored in storage system 126.

A fragment object is an object representing content used in shell documents. Each fragment object 123, 124 may each include one or more properties 1-N associated with the content represented by the object. Properties 1-N may include context information reflecting one or more user-ascertainable characteristics of the fragment object's content. Context information, as the term is used herein, refers to information that describes one or more characteristics of a fragment object. Such context information may be configured in a user-ascertainable format that allows a user to understand the information conveyed, when displayed, without decoding or deciphering the information via the assistance of tools, tables, maps, codes, or any other additional processing. That is, context information may convey data, when displayed, that a user may read and understand, as opposed to data that is formed in a cryptic format. For example, if fragment object 123 represents content associated with instructions on performing a particular task in a user manual, property 1 of fragment object 123 may reflect the title of the instructions or task. Further, property 2 of exemplary fragment object 123 may reflect the textual size of the content, while property 3 may reflect a summary of the content. It should be noted that any one of the properties associated with a fragment object may reflect any type of characteristic associated with the content associated with a fragment object. Thus, property 1 may reflect the size of the fragment object, while property 2 reflects the title of the object. Fragment objects 123 and 124 may be generated by users operating computer systems internal or external to data warehouse system 120. Further, fragment objects 123 and 124 may be generated by computer executed processes internal or external to data warehouse system 120.

Fragment object properties may be generated by data warehouse computing system 122 and/or external computing systems (not shown) that perform tasks for creating one or more of the fragment object properties. For instance, an external computing system may be configured to provide a summary of a fragment object stored in storage system 126. In one aspect, data warehouse system 120 provides a request to the external computing system to generate a particular property based on a request for a fragment object received from authoring computing system 110. The external computing system then generates and returns the requested property (e.g., creates a summary of a the fragment object) to data warehouse system 120. Alternatively, or additionally, data warehouse system 120 may commission the external computing system to provide a particular property for a fragment object as the object is generated.

Further, aspects of the invention enable data warehouse system 120 to include processes that, when executed by a processor, generate one or more fragment object properties based on the request from authoring computing system 110. Alternatively, or additionally, data warehouse system 120 may generate the one or more properties based on predetermined criteria associated with the type of fragment objects created and maintained by storage system 126. For example, data warehouse system 120 may implement a set of rules and processes that establish the types of properties that may be created for each type of fragment object. For instance, a set of rules may limit the properties for one type of fragment object (e.g., content associated with a user manual) to include title and size while another set of rules may limit properties for another type of fragment object (e.g., content associated with specifications for a product) to title alone. The above rules and types of fragment objects are exemplary and are not intended to be limiting. Other rules, fragment objects, processes, and properties may be implemented by aspects of the present invention to provide contextual reference information for the fragment objects.

Network 130 may be one or more communication networks that facilitate communications between authoring computing system 110 and data warehouse system 120. Based on the configuration of environment 100, network 130 may include one or more of an Extranet, an Intranet, the Internet, a Local Area Network (LAN), public switch telephone network, Integrated Services Digital Network (ISDN), radio links, Global System for Mobile Communication (GSM), and any other form of wired or wireless communication networks. Accordingly, network 130 may be compatible with any type of communication protocol used by the components of environment 100 to exchange information, such as Transmission Control/Internet Protocol (TCP/IP), Hypertext Transfer Protocol (HTTP), Wireless Application Protocol (WAP), extensible Markup Language (XML), Wireless Markup Language, etc.

Creating Shell Documents with References to Fragment Objects

Figure 2A:
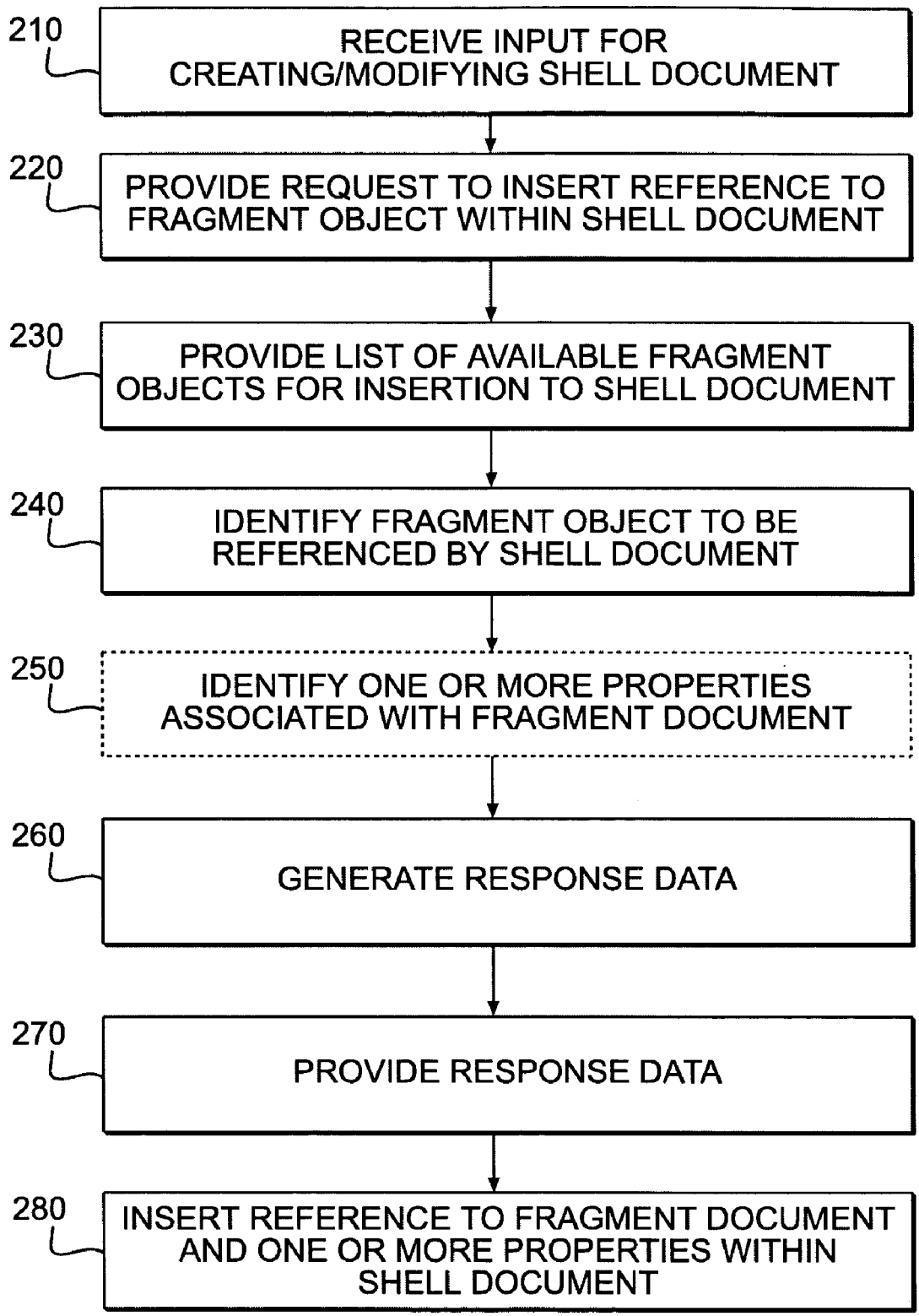
FIG. 2A illustrates a flowchart of an exemplary shell document creation process consistent with certain aspects related to the present invention.
Figure 2B:
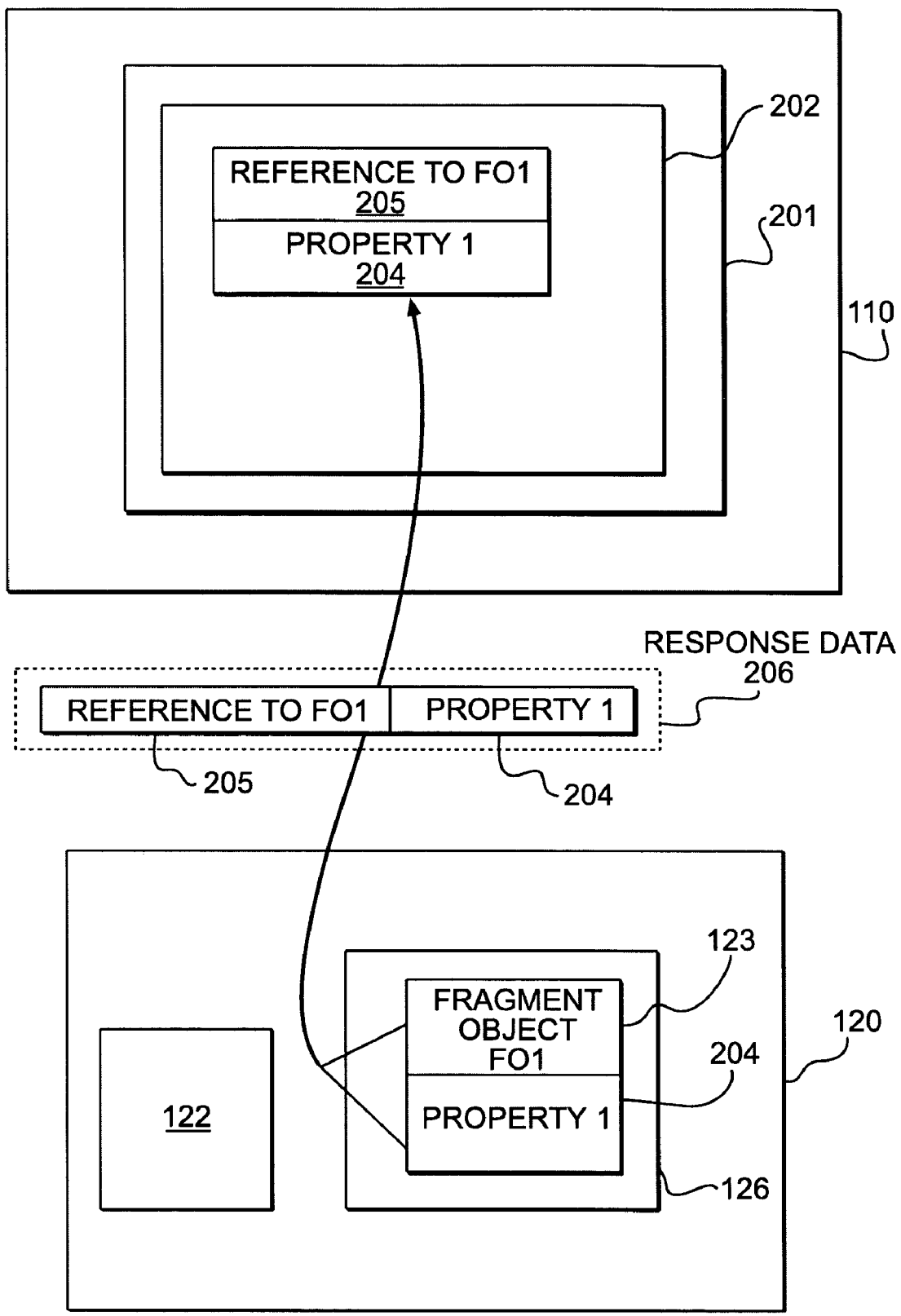
FIG. 2B illustrates a block diagram associated with the shell document creation process consistent with certain aspects related to the present invention.

As explained, aspects of the present invention enable an author to create a shell document by referencing fragment objects that make up at least a portion of the shell document. In accordance with these aspects, the author may implement editing software processes executed by authoring computing system 110 that allow the author to create and/or modify a shell document through a user interface. FIG. 2A shows a flowchart of an exemplary shell document creation process consistent with these aspects of the invention. FIG. 2B shows an exemplary block diagram associated with the shell document creation process. Thus, both FIGS. 2A and 2B are referenced in connection with the description of the shell document creation process.

Initially, an author operating authoring computing system 110 may implement an editor software process to create a shell document 202 in a user interface 201 using a document description language, such as XML. For instance, the author may write an XML shell document that defines how shell document 202 is to be published by a business process. While generating shell document 202, the author may input commands to authoring computing system 110 that describe how shell document 202 is formatted (Step 210). In one aspect, shell document 202 may require content that is associated with a fragment object 123 maintained by data warehouse system 120. Accordingly, the author may generate a request for inserting a reference to fragment object 123 within shell document 202. The request may include an identifier of the referenced fragment object. Additionally, the request may include an identifier of one or more properties 204 associated with the referenced fragment object. The request may be provided from authoring computing system 110 to data warehouse computing system 122 (Step 220).

Based on the request, data warehouse system 120 may determine and provide a list of fragment objects available in storage system 126 for reference by shell document 202 being created by the author (Step 230). Authoring computing system 110 may then provide the list to the author via a display device. In one aspect, authoring computing system 120 may maintain the list of available fragment objects based on information provided by data warehouse system 120.

The author may review the list of available fragment objects and identify a fragment object (e.g., fragment object 123) to be referenced by shell document 202 (Step 240). In another aspect of the invention, the author may also specify selection and/or search criteria for the fragment object. Alternatively, the author may identify one or more properties associated with the referenced fragment object 123 to be returned with the reference to the fragment object (Step 250). Because Step 250 is an optional process step, it is shown in FIG. 2 as a dotted process step. Accordingly, aspects of the invention may bypass Step 250 and proceed directly to Step 260 when generating a shell document.

Once the fragment object to be referenced, and possibly one or more properties associated with the object (e.g., property 204), is identified, authoring computing system 110 may generate and provide a request for the reference fragment object to data warehouse computing system 122 via network 130. The request may include an identifier of the fragment object and possibly identifiers of one or more of the parameters that may have been identified in optional step 250. Based on the request, data warehouse computing system 122 may generate response data 206 (Step 260). Response data 206 may include the reference to the fragment object 205 identified by the author in Step 240 and included in the request. Additionally, data warehouse system 122 adds to response data 206 one or more parameters (e.g., parameter 204) that correspond to the referenced fragment object 123. The one or more parameters 204 included in response data 206 may correspond to the parameter(s) identified by the author in Step 250 or may correspond to parameters that data warehouse computing system 122 determines to be included in the response data.

Once response data 206 is generated, data warehouse computing system 122 provides response data 206 to authoring computing system 110 (Step 270). Subsequently, the editing software process executed by authoring computing system 110 may insert the reference to the fragment object 205 and the one or more properties 204 included in response data 206 to shell document 202 (Step 280). Authoring computing system 110 may then render the response data such that reference to the fragment object 205 along with its one or more properties 204 are displayed in user interface 201 provided by a display device that is used by the author when creating shell document 202. In certain aspects, data warehouse computing system 110 may transform property data prior to inclusion in shell document 202 and/or rendering by the display device. For example, data warehouse computing system 110 may change the text of one property data into an all uppercase format.

Aspects of the invention enable the property 204 to be displayed in such a manner that the context information reflecting one or more characteristics of fragment object 123 is presented in a user-ascertainable format. For example, property 204 may present the title of fragment object 123 in textual format that does not require the author to decode or decipher using techniques other than standard viewing and cognitive tools. That is, the author may simple read the information and understand the name of the referenced object as opposed to viewing a cryptic message that requires additional decoding by the author or some processing tool. Accordingly, aspects of the present invention enable an author to view context information regarding the referenced fragment object based on the displayed properties associated with the fragment object.

The shell document may include multiple references to different fragment objects, such as fragment objects 123 and 124. These objects may be of different types (e.g., text-based content, graphical-based content, etc.). Accordingly, aspects of the present invention enable the shell document to include references to different types of fragment objects and different types of properties for these objects. For example, a user interface that presents the shell document may include a reference to fragment object 123 with a corresponding property reflecting the title of object 123 and a reference to fragment object 124 with a corresponding property reflecting the size of object 124. Other combinations of fragment object types and associated properties may be implemented by aspects of the present invention.

Generating Response Data

Figure 3:
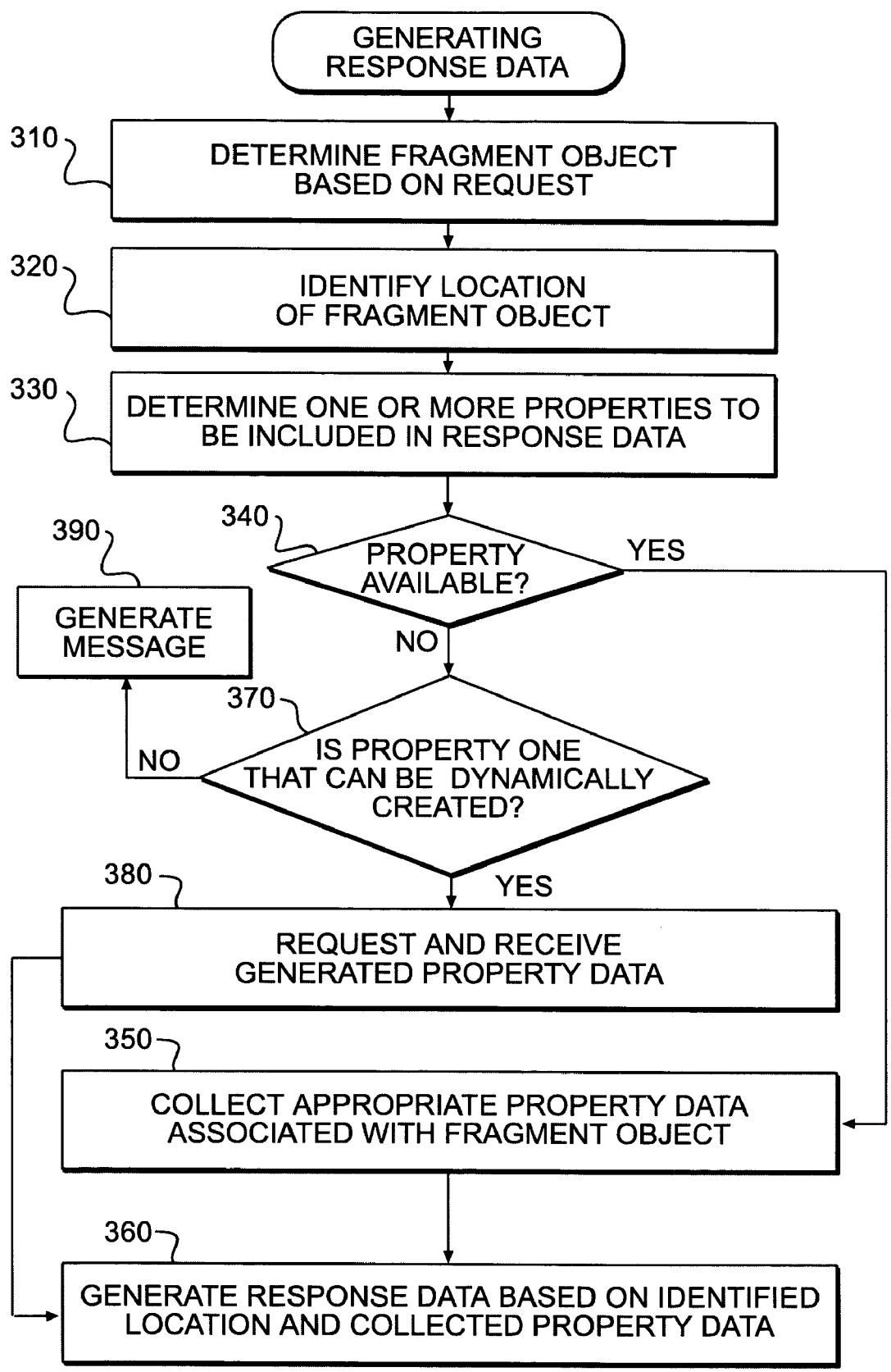
FIG. 3 illustrates a flowchart of an exemplary response data generation process consistent with certain aspects related to the present invention.

As explained, data warehouse computing system 122 may generate response data 206 based on the request from authoring computing system 110 for referencing a fragment object. FIG. 3 shows a flowchart of an exemplary response data generation process consistent with these aspects of the present invention. When data warehouse computing system 122 receives the request from authoring computing system 110, it may first analyze the information included in the request to determine the fragment object (e.g., object 123) to be referenced by the shell document (e.g., document 202) being created by the author (Step 310). Additionally, data warehouse computing system 122 may determine a set of fragment objects. Once the fragment object is determined, data warehouse computing system 122 may identify the location of the fragment object within storage system 126 (Step 320). Additionally, data warehouse computing system 122 may determine the one or more properties associated with the referenced fragment object that are to be included in the response data (Step 330). In one aspect, data warehouse computing system 122 may base the determination of properties on whether data warehouse system 120 implements processes that allow it to accept properties identified by the author, and inserted in the request from authoring computing system 110. Thus, if the author identifies one or more properties in Step 250 of FIG. 2, and these properties are included in the request by authoring computing system 110, data warehouse computing system 122 may determine that the identified properties are the ones to be processed. Alternatively, data warehouse computing system 122 may automatically determine one or more properties to be included in response data 206 based on predetermined rules and/or criteria associated with the type of fragment object referenced by the author. For instance, data warehouse computing system 122 may determine that a default property is always associated with a referenced fragment object, such as the title indicative of the content of the fragment object. Other processes and methodologies may be implemented by data warehouse computing system 122 to determine the one or more properties to be included in response data 206, and the above examples are not intended to be limiting.

Once the one or more properties are determined, data warehouse computing system 122 may determine whether the properties are available (e.g., maintained by storage system 126) (Step 340). If so, the response data generation process proceeds to Step 350 where data associated with the determined one or more properties are collected based on the identified fragment object (Step 350). Further, data warehouse computing system 122 generates the appropriate reference data that references the fragment object in the location identified in Step 320. Based on the collected property data and the generated reference data, data warehouse computing system 122 generates the response data (e.g., response data 206) that is subsequently provided to authoring computing system 110 (Step 360).

In one aspect of the invention, certain determined properties may not be readily available by storage system 126. In such instances, the response data generation process may perform an optional set of processes that enable a determined property to be created dynamically for inclusion in the response data. In this aspect, if a determined property is not available (Step 340; NO), data warehouse computing system 122 may determine whether the property is one that can be created dynamically (Step 370). If not (Step 370; NO), data warehouse computing system 122 may generate a message reflecting that the property could not be added to the response data (Step 390). The message may be provided to a process executing in data warehouse system 120 and/or authoring system 110. In one aspect, the message may be included in the response data (e.g., response data 206) that is sent to authoring computing system 110 for display on user interface 201. Other processes of handling unavailable properties may be implemented by environment 100.

If, however, the determined property can be created dynamically (Step 370; YES), data warehouse computing system 122 may generate a request to create the property (Step 380). The request may be provided to a software process executed by data warehouse system 120 that generates the property based on the type of property and referenced fragment object. Alternatively, data warehouse computing system 122 may send the request to a computing system external to data warehouse system 120 for generation of the determined property. In such instances, the external system may access the fragment object to generate the property data in accordance with predetermined criteria provided by data warehouse system 120. For example, if the external system is requested to create a summary of a referenced fragment object as a parameter, data warehouse system 120 may set criteria that defines the size and format of the summary in terms of text, graphical dimensions (e.g., pixel size, etc.), etc. The external system may generate and provide the property data to data warehouse computing system 122 for generation of the response data (Step 360).

Exemplary Shell Document Creation Process

Aspects of the present invention enable authoring computing system 110 to provide contextual information related to a fragment object that is being referenced by a shell document. Thus, authoring computing system 110 may provide an author of the shell document (or subsequent viewer of the document) information reflecting a requested referenced fragment object, such as the reference data pointing to the appropriate object, and information describing certain properties associated with the referenced object, such as title, summary, size, language, etc. To better illustrate these aspects of the present invention, FIGS. 4A-4D show exemplary screen shots of an XML editing software process that provides contextual reference information associated with referenced fragment objects in a shell document in a manner consistent with certain aspects of the present invention.

Figure 4A:
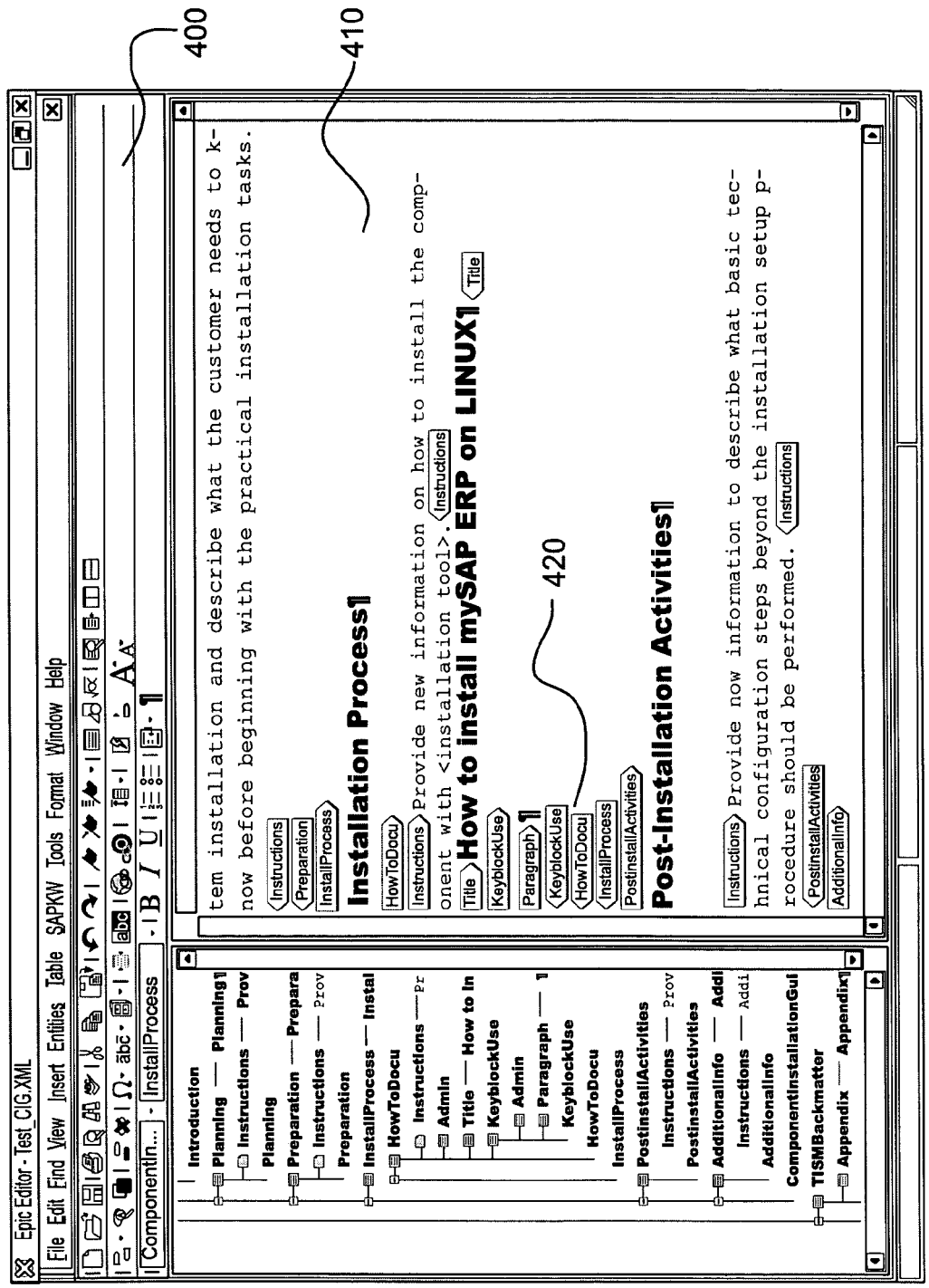
FIGS. 4A-4D illustrate exemplary screen shots associated with inserting reference data in a shell document consistent with certain aspects related to the present invention.
Figure 4B:
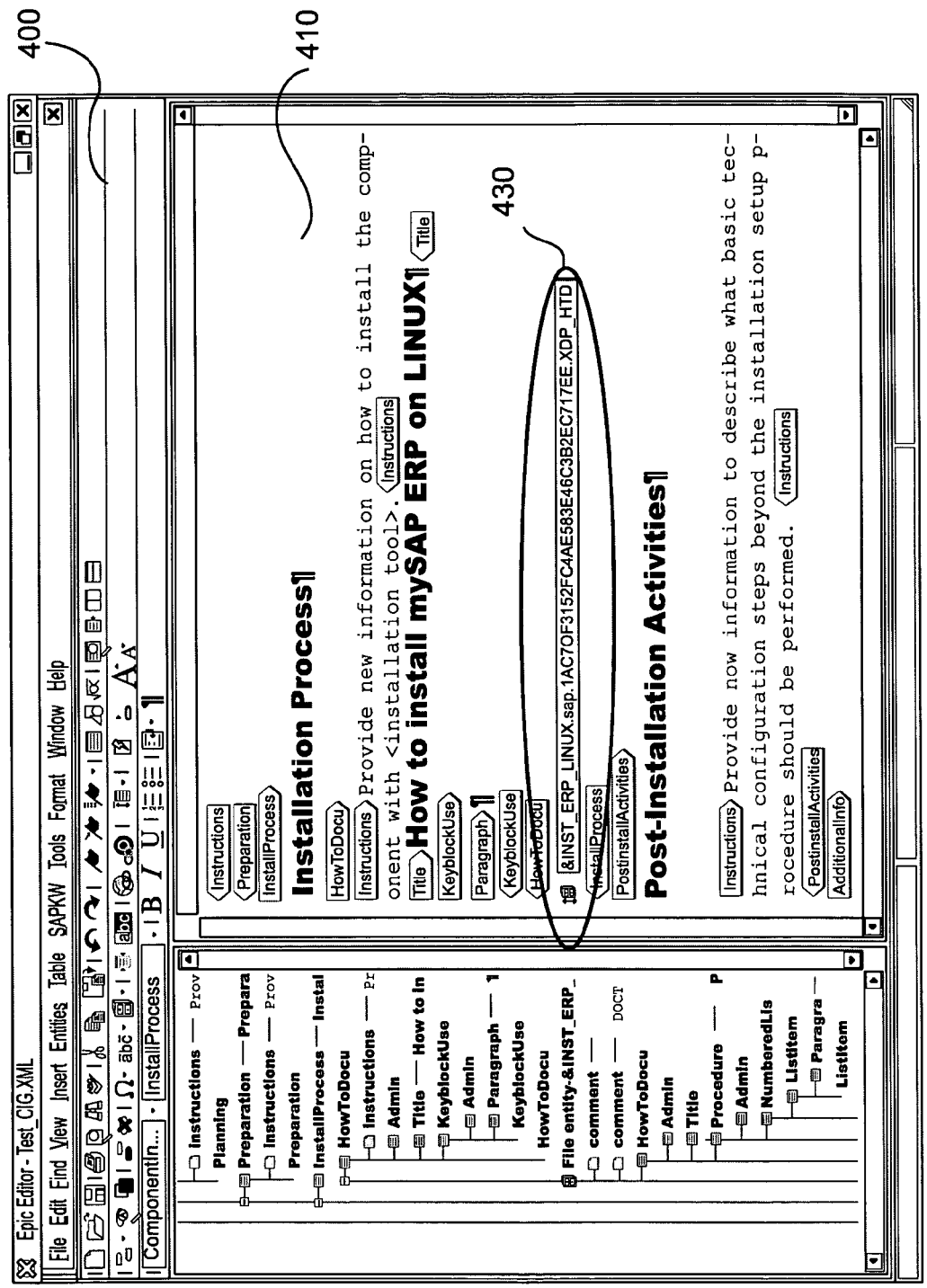

FIG. 4A shows a screenshot 400 including an exemplary shell document 410 under creation by an author and displayed by authoring computing system 110. When creating shell document 400, the author may direct authoring computing system 110 to insert a reference to a desired fragment object. For instance, the author may wish to insert a reference to external content in the "HowtoDocu" portion 420 of shell document 410. In response to the author's request, authoring computing system 110 may retrieve and render information in the displayed shell document reflecting the inserted reference. FIG. 4B shows an example of shell document 410 including technical reference information 430 to a fragment object. As shown, the reference information may include data that is cryptic to the author. That is, while the reference information indicates that the reference is placed in the shell document, the information does not include contextual information associated with the fragment object referenced by the information.

Figure 4C:
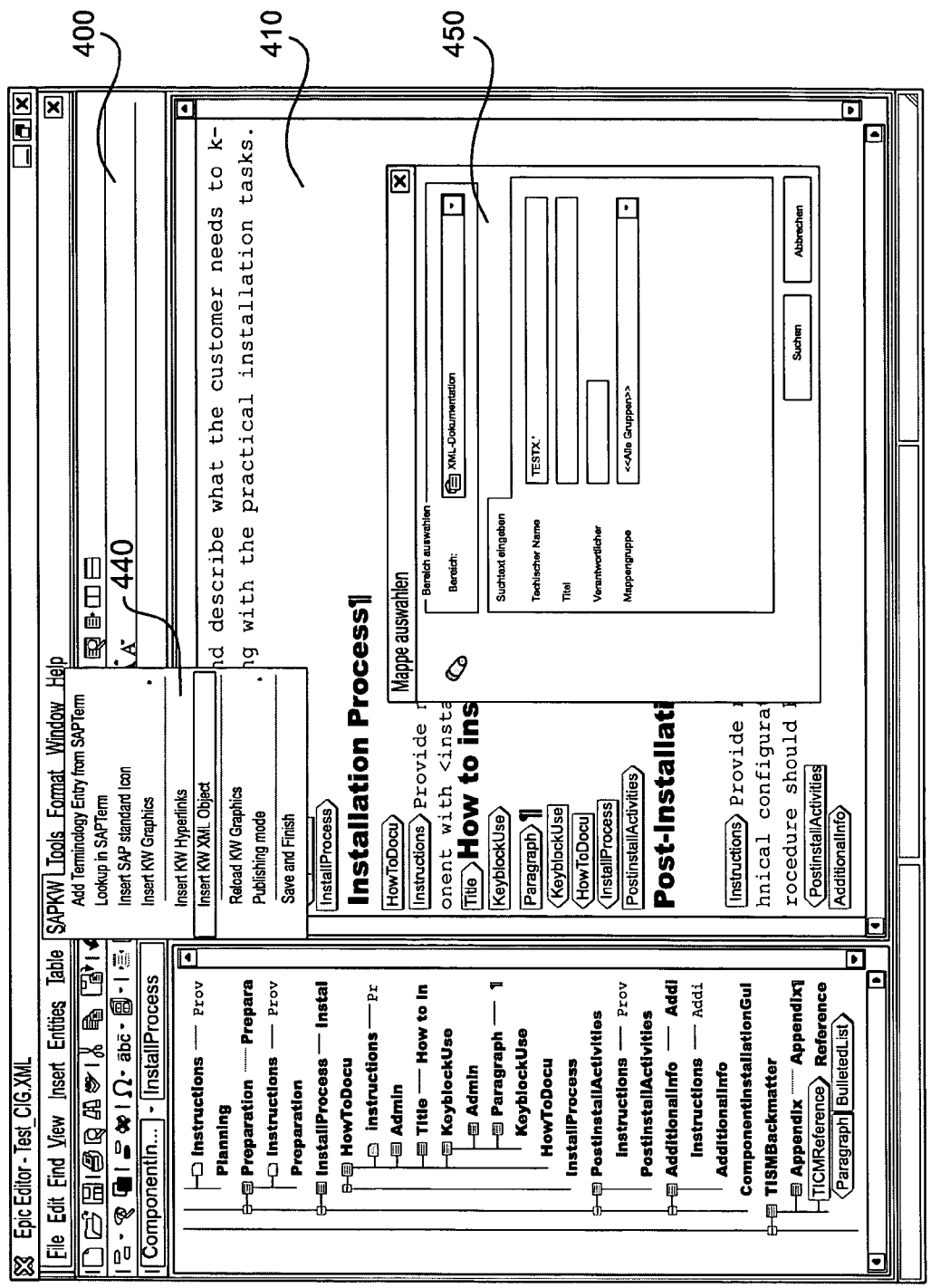

To address these concerns, aspects of the present invention allow the author to receive contextual information in the form of parameter data associated with a requested reference to a fragment object. FIG. 4C shows screen shot 400 including an interface option 440 that allows the author to select an option when inserting a reference to a fragment object. Upon selecting interface option 440, aspects of the invention may allow screen shot 400 to further include a displayed component 450 that requests fragment object identifier information from the author. Accordingly, the author may identify the particular fragment object to be referenced by shell document 410 through various options included in component 450.

Figure 4D:
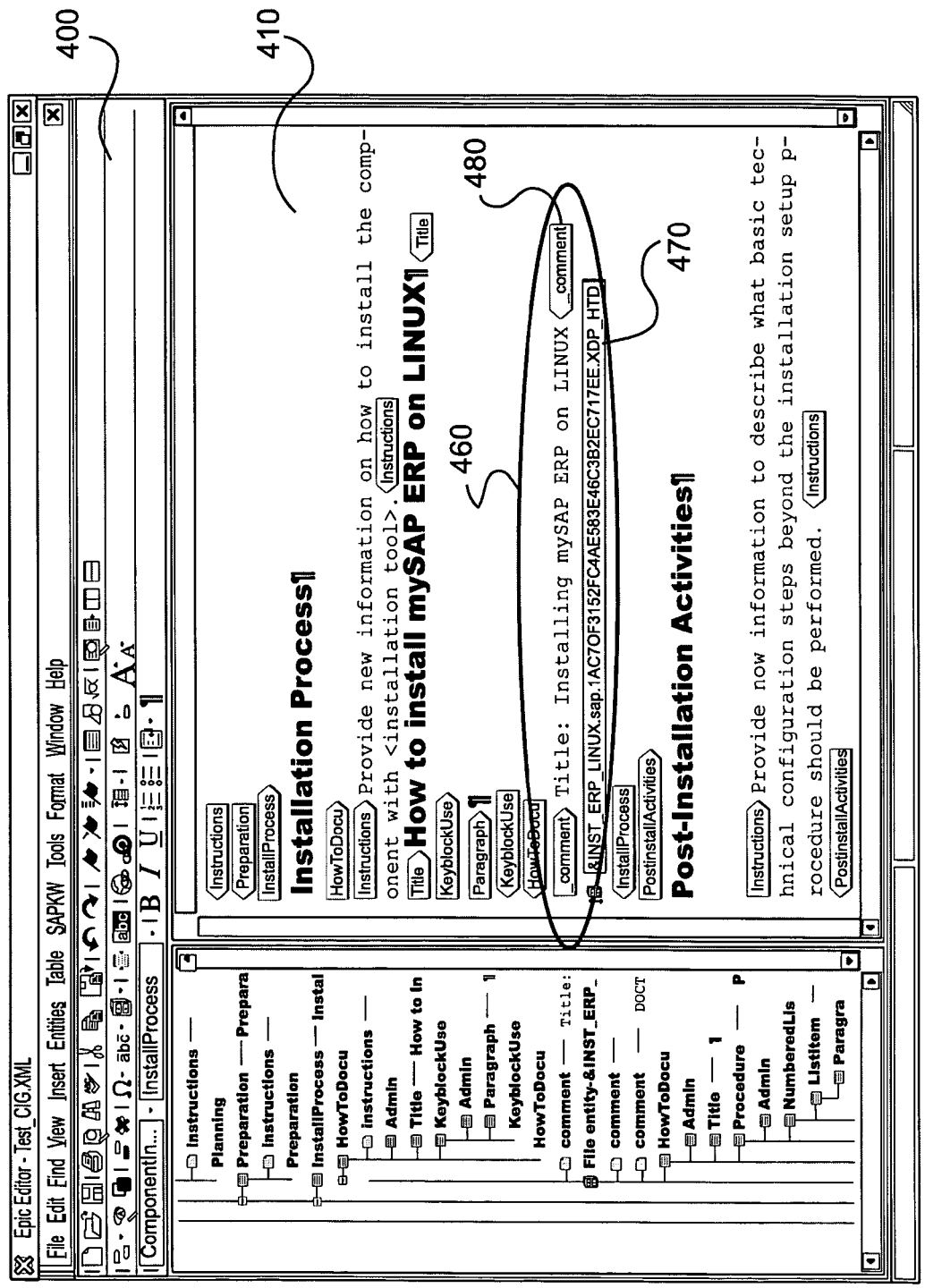

Once author computing system 110 receives the information identifying the fragment object to be referenced by shell document 410, it may receive the appropriate reference information associated with the object in the form of response data provided by data warehouse system 120. As discussed above, aspects of the invention enable authoring computing system 110 to also receive one or more parameters associated with the requested fragment object based on the request by the author and/or predetermined criteria selected by data warehouse system 120. Upon receiving the response data, authoring computing system 110 may insert the reference to the fragment object in the appropriate location of shell document 410. Further, the one or more parameters included in the response data may also be inserted in shell document 410 to provide contextual information associated with the reference. FIG. 4D shows shell document 410 with response data 460 including a reference 470 to the requested fragment object and a parameter 480 associated with the referenced fragment object. In this example, parameter 480 represents a title of the fragment object associated with reference 470. As shown, shell document 410 now includes contextual information for reference 470 in the form of parameter 480. As explained above, other parameters may be included in the response data that is rendered by authoring computing system 110 to provide contextual information for a referenced fragment object and the data shown in FIGS. 4A-4D are exemplary and not intended to be limiting.

CONCLUSION

The above described user interfaces are exemplary and are not intended to be limiting. Methods and systems consistent with aspects related to the present invention may generate and display different types of user interfaces that reflect the result data received by authoring computing system 110.

For purposes of explanation only, certain aspects of the present invention are described herein with reference to the components illustrated in FIG. 1. The functionality of the illustrated components may overlap, however, and may be present in a fewer or greater number of elements and modules. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of steps described in FIGS. 2 and 3 are exemplary and not intended to be limiting. Thus, other method steps may be used, and even with the methods depicted in FIGS. 2 and 3 the particular order of events may vary without departing from the scope of the present invention. Moreover, certain steps may not be present and additional steps may be implemented in FIGS. 2 and 3. Also, the processes described herein are not inherently related to any particular apparatus and may be implemented by any suitable combination of components.

The foregoing description of possible implementations consistent with the present invention does not represent a comprehensive list of all such implementations or all variations of the implementations described. The description of only some implementation should not be construed as an intent to exclude other implementations. Artisans will understand how to implement the invention in the appended claims in many other ways, using equivalents and alternatives that do not depart from the scope of the following claims. Moreover, unless indicated to the contrary in the preceding description, none of the components described in the implementations are essential to the invention.

What is claimed is:

1. A computer-implemented method for providing reference information for an object by using a computer, comprising:

receiving a request from an author to insert a reference to a fragment object into a shell document, the request including a parameter provided by the author, wherein the shell document is separate from the fragment object and the fragment object is of a first type and is stored in a storage device of the computer;

providing to display a list of fragment objects by searching through a storage device of the computer using the parameter as search criteria, the fragment objects being stored in the storage device;

receiving, from the author, a selection of the fragment object, the fragment object being a known fragment object of a first type and being selected from the list of fragment objects;

comparing a predetermined rule associated with the fragment object with the first type to determine an identity of a first property that is compatible with the fragment object;

searching in the storage device for the first property;

determining whether the first property can be dynamically generated when the search is unsuccessful, wherein a message is provided to indicate that the first property is not available when the search result is unsuccessful and when the first property cannot be dynamically generated;

generating, based on the predetermined rule, the first property when it is determined that the first property can be dynamically generated, the first property including textual information describing a characteristic of the fragment object;

retrieving the first property from the storage device when the search is successful;

generating, based on the request, response data including the reference to the fragment object and the first property associated with the fragment object, wherein the first property included in the response data is the retrieved first property when the search is successful, and wherein the first property included in the response data is the generated first property when the search is unsuccessful;

modifying the shell document by inserting the response data into the shell document, wherein the reference and the first property are inserted into an author identified location within the shell document, the reference being inserted without inserting the fragment object, that is known, in the shell document;

formatting the modified shell document based on commands inputted by the author; and on a display device rendering the modified and formatted shell document including the response data, the response data conveying a user-ascertainable characteristic of the fragment object by using the textual information included in the first property, wherein the user-ascertainable characteristic describes the characteristic of the fragment object.

2. The method of claim 1, wherein the fragment object is associated with a set of properties and generating the response data includes:

identifying the fragment object based on the request; and
determining the first property from the set of properties.

3. The method of claim 2, wherein determining the first property includes:

determining the first property from the set of properties based on data associated with the fragment object.

4. The method of claim 2, wherein determining the first property includes:

determining the first property from the set of properties based on the type of the fragment object.

5. The method of claim 4, wherein the shell document includes a second reference to a second fragment object having a corresponding second property and wherein rendering the modified shell document includes:

rendering the modified shell document including the response data wherein at least one of the first property and the second property conveys a user-ascertainable characteristic of the first and second fragment objects.

6. The method of claim 5, wherein the first and second properties are different types of properties.

7. The method of claim 1, wherein the first property includes data reflecting at least one of a title of the fragment object, a summary description of the fragment object, a location identifier of the fragment object, and a size of the fragment object.

8. The method of claim 1, wherein generating the response data is performed by the computer and the fragment object is associated with a set of properties maintained by the computer, wherein the first property is not included in the set of properties, and wherein generating the response data includes:

generating a request to generate the first property; and
receiving the first property from a second computer in response to the request to generate the first property when the first property cannot be dynamically generated.

9. The method of claim 1, wherein receiving the request to insert the reference includes:

displaying the list of fragment objects, the fragment objects including at least one fragment object being referenced by the shell document.

10. The method of claim 9, wherein receiving the request to insert the reference includes:

receiving an indication of the first property from the author with the request identifying the fragment object.

11. The method of claim 1, further comprising:
displaying the message when the first property cannot be dynamically generated.

12. A system providing reference information, including:

a first computing system that executes a first process for generating the shell document on a display, rendering the shell document for editing by an author, and receiving a first request from the author to insert a reference to a first fragment object in the shell document, the first request including a parameter provided by the author, wherein the shell document is separate from the fragment object and the first fragment object is of a first type; and a second computing system having a storage device and configured to:

provide to display, a list of fragment objects by searching through the storage device using the parameter as search criteria, the fragment objects being stored in the storage device;

receiving, from the first computing system, a selection of the first fragment object, the fragment object being a known fragment object and being selected from the list of fragment objects;

comparing a predetermined rule associated with the first fragment object with the first type to determine an identity of a first property that is compatible with the first fragment object;

search, in the storage device, for the first property;

determine whether the first property can be dynamically generated when the search is unsuccessful, wherein a message is provided to indicate that the first property is not available when the search result is unsuccessful and when the first property cannot be dynamically generated;

retrieving the first property from the storage device when the search is successful;

generate, based on the predetermined rule, the first property when it is determined that the first property can be dynamically generated, the first property including textual information describing a characteristic of the fragment object, wherein the first property included in the response data is the retrieved first property when the search is successful, and wherein the first property included in the response data is the generated first property when the search is unsuccessful;

generate the reference to the first fragment object based on the first request; and provide to the first computing system the generated reference to the first fragment object and the first property;

wherein the first computing system updates the rendering of the shell document by editing the rendered shell document based on commands inputted by the author and by including the reference to the first fragment object and the first property into an author identified location within the rendered shell document the first property conveying the characteristic of the fragment object in a user-ascertainable format by using the textual information to describe the characteristic of the fragment object, the reference being inserted without inserting the fragment object, that is known, in the shell document.

13. The system of claim 12, wherein the shell document includes a reference to a second fragment object having a corresponding second property and wherein the first computing system renders an updated shell document on a user interface, the updated shell document including the reference to the first fragment object, the first property, the reference to the second fragment object and the second property.

14. The system of claim 12, wherein the second computing system maintains a set of properties associated with the first fragment object and the first property is not included in the set of properties, and wherein the second computing system generates a request to generate the first property and receives the first property from a third computing system in response to the request to generate the first property when the first property cannot be dynamically generated.

15. A computer-implemented method for providing contextual information associated with referenced objects in a description document by using a computer, the method comprising:

receiving input for editing a shell document;

receiving a request to insert a reference to an object within the shell document, the request including a parameter, wherein the shell document is separate from the object and the object is stored in a storage device of the computer;

providing to display, a list of objects by searching through the storage device using the parameter as search criteria, the objects being stored in the storage device;

receiving a selection of the object, the object being a known object of a first type and being selected from the list of fragment objects;

comparing a predetermined rule associated with the object with the first type to determine an identity of a first property that is compatible with fragment object;

searching, in the storage device, for the first property;

determining whether a first property can be dynamically generated when the search is unsuccessful, wherein a message is provided to indicate that the first property is not available when the search result is unsuccessful and when the first property cannot bed dynamically generated;

generating, based on the predetermined rule, the first property when it is determined that the first property can be dynamically generated, the first property including textual information describing a characteristic of the object;

retrieving the first property from the storage device when the search is successful;

generating, based on the request, response data including the reference to the object and the first property associated with the object, wherein the first property included in the response data is the retrieved first property when the search is successful, and wherein the first property included in the response data is the generated first property when the search is unsuccessful;

editing the shell document by inserting the response data into the shell document, wherein the reference and the first property are inserted into an author identified location within the shell document, the reference being inserted without inserting the object, that is known, in the shell document;

formatting the modified shell document based on commands inputted by the author; and rendering on a display device the modified and formatted shell document by including the response data describing a user-ascertainable characteristic of the object within the shell document by using the textual information included in the first property, wherein the user-ascertainable characteristic describes the characteristic of the object.

16. The method of claim 15, further comprising:

displaying the message when the first property cannot be dynamically generated.

17. A computer-implemented method for providing reference information for an object by using a computer, comprising:

receiving a request to insert a reference to a object into a shell document, the request including a parameter, wherein the shell document is separate from the object and the object is of a first type and is stored in a storage device of the computer;

providing to display a list of objects by searching through a storage device of the computer using the parameter as search criteria, the objects being stored in the storage device;

receiving a selection of the object, the object being a known object of a first type and being selected from the list of fragment objects;

comparing a predetermined rule associated with the object with the first type to determine an identity of a property that is compatible with the object;

searching in the storage device for the property;

retrieving the property from the storage device when the search is successful;

determining whether the property can be dynamically generated when the search is unsuccessful, wherein a message is provided to indicate that the property is not available when the search result is unsuccessful and when the property cannot be dynamically generated;

generating, based on the predetermined rule, the property when it is determined that the property can be dynamically generated, the property including textual information describing a characteristic of the object, wherein the property is retrieved from an additional storage device when it is determined that the property cannot be dynamically generated;

modifying the shell document by inserting the response data into the shell document, the reference and the property being inserted into an author identified location within the shell document, the reference being inserted without inserting the object, that is known, in the shell document, wherein the property inserted in the shell document data is the retrieved property when the search is successful, and wherein the property inserted in the shell document is the generated property when the search is unsuccessful;

formatting the modified shell document based on commands inputted by a user; and rendering on a display device, the modified and formatted shell document including the response data such that the response data conveys a user-ascertainable characteristic of the object by using the textual information included in the property, wherein the user-ascertainable characteristic describes the characteristic of the object.

\* \* \* \* \*

UNITED STATES PATENT AND TRADEMARK OFFICE
CERTIFICATE OF CORRECTION

PATENT NO. : 7,650,324 B2 Page 1 of 1
APPLICATION NO. : 11/210962
DATED : January 19, 2010
INVENTOR(S) : Dhairyawan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 353 days.

Signed and Sealed this

Twenty-third Day of November, 2010

David J. Kappos
*Director of the United States Patent and Trademark Office*